US012739669B2

(12) United States Patent
Qi

(10) Patent No.: US 12,739,669 B2
(45) Date of Patent: Sep. 15, 2026

(54) SYSTEM AND METHOD FOR ESTIMATING SIGNAL TO INTERFERENCE AND NOISE RATIO

(71) Applicant: GM Global Technology Operations LLC, Detroit, MI (US)

(72) Inventor: Wenyuan Qi, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 355 days.

(21) Appl. No.: 18/531,974

(22) Filed: Dec. 7, 2023

(65) Prior Publication Data

US 2025/0168666 A1 May 22, 2025

(30) Foreign Application Priority Data

Nov. 17, 2023 (CN) ........................ 202311652308.X

(51) Int. Cl.
*H04W 24/06* (2009.01)
*G06N 20/00* (2019.01)

(52) U.S. Cl.
CPC ............ *H04W 24/06* (2013.01); *G06N 20/00* (2019.01)

(58) Field of Classification Search
CPC ..... H04W 24/06; H04W 24/10; H04W 16/18; G06N 20/00; G06N 3/08; H04B 17/336
See application file for complete search history.

(56) References Cited

U.S. PATENT DOCUMENTS

| | | | | |
|---|---|---|---|---|
| 10,922,211 | B2 | 2/2021 | Jaros et al. | |
| 11,128,391 | B1 * | 9/2021 | Aldossari | H04B 17/3911 |
| 11,129,192 | B2 * | 9/2021 | Kela | H04W 72/1263 |
| 11,438,792 | B2 | 9/2022 | Zhou et al. | |
| 12,010,678 | B2 | 6/2024 | Kim et al. | |
| 12,278,752 | B2 | 4/2025 | Mengwasser et al. | |
| 12,323,819 | B2 | 6/2025 | Tosyali et al. | |
| 12,324,045 | B2 | 6/2025 | Di Girolamo et al. | |
| 12,363,573 | B2 | 7/2025 | Ly et al. | |
| 12,375,954 | B2 | 7/2025 | Hirzallah et al. | |
| 12,389,273 | B2 | 8/2025 | Yeh et al. | |
| 12,414,021 | B2 | 9/2025 | Yeung et al. | |
| 12,445,905 | B2 | 10/2025 | Balakrishnan et al. | |
| 12,484,000 | B2 | 11/2025 | Sun et al. | |

(Continued)

FOREIGN PATENT DOCUMENTS

| | | | |
|---|---|---|---|
| WO | 2019211792 | A1 | 11/2019 |
| WO | 2022069061 | A1 | 4/2022 |

*Primary Examiner* — Tuan H Nguyen
(74) *Attorney, Agent, or Firm* — Vivacqua Crane, PLLC

(57) ABSTRACT

A method for estimating signal to interference and noise ratio (SINR) in a wireless network environment is provided. The method may include collecting a plurality of wireless connection datasets about the wireless network environment. Each of the plurality of wireless connection datasets includes at least one measured environment parameter and a measured SINR. The method further may include generating a regression model based at least in part on the plurality of wireless connection datasets. The regression model is configured to determine an estimated SINR based on the at least one measured environment parameter. The method further may include training an SINR optimization machine learning algorithm to determine an optimized estimated SINR based at least in part on the estimated SINR.

16 Claims, 4 Drawing Sheets

(56) References Cited

U.S. PATENT DOCUMENTS

| | | | |
|---|---|---|---|
| 12,501,234 | B2 | 12/2025 | Soryal |
| 12,501,433 | B2 | 12/2025 | Freda et al. |
| 12,532,192 | B2 | 1/2026 | Imran et al. |
| 2019/0342180 | A1 | 11/2019 | Figueira et al. |
| 2021/0294944 | A1 | 9/2021 | Nassar et al. |
| 2023/0117824 | A1 | 4/2023 | Coster et al. |
| 2024/0121790 | A1 | 4/2024 | Abotabl et al. |
| 2025/0056343 | A1 | 2/2025 | Awada et al. |
| 2025/0081145 | A1 | 3/2025 | Hirzallah et al. |
| 2025/0184861 | A1 | 6/2025 | Sahyoun et al. |
| 2025/0203399 | A1 | 6/2025 | Cheema et al. |
| 2025/0211312 | A1 | 6/2025 | Li et al. |
| 2025/0234233 | A1 | 7/2025 | Kim et al. |
| 2025/0247858 | A1 | 7/2025 | Talarico et al. |
| 2025/0260449 | A1 | 8/2025 | Guan et al. |
| 2025/0317809 | A1 | 10/2025 | Kim et al. |
| 2025/0337474 | A1 | 10/2025 | Pezeshki et al. |
| 2025/0343591 | A1 | 11/2025 | Li et al. |
| 2025/0344085 | A1 | 11/2025 | Kim et al. |
| 2025/0386217 | A1 | 12/2025 | Kim et al. |
| 2025/0386262 | A1 | 12/2025 | Li et al. |

* cited by examiner

SYSTEM AND METHOD FOR ESTIMATING SIGNAL TO INTERFERENCE AND NOISE RATIO

The present disclosure relates wireless network communications, and more particularly, to systems and methods for estimating signal to interference and noise ratio (SINR) in a wireless network environment.

To increase occupant awareness and convenience, vehicles may be equipped with various sensors and systems such as, for example, perception sensors (e.g., camera, radar, ultrasonic distance sensors, and/or the like), microphones, navigation systems, advanced driver assistance systems (ADAS), automated driving systems (ADS), and/or the like. Such sensors and systems may produce data to be wirelessly transferred using cellular network infrastructure. Therefore, an increasing number of vehicles may utilize cellular network infrastructure to transfer critical data related to occupant awareness and convenience. However, variance in environmental conditions, including, for example, the presence of tall buildings and fluctuations in a number of connected devices (e.g., connected vehicles) may result in variation in signal to interference and noise ratios, even across relatively small geographical areas.

Thus, while current systems and methods for estimating signal to interference and noise ratio (SINR) in a wireless network environment achieve their intended purpose, there is a need for a new and improved system and method for estimating signal to interference and noise ratio (SINR) in a wireless network environment at a high geographical resolution.

SUMMARY

According to several aspects, a method for estimating signal to interference and noise ratio (SINR) in a wireless network environment is provided. The method may include collecting a plurality of wireless connection datasets about the wireless network environment. Each of the plurality of wireless connection datasets includes at least one measured environment parameter and a measured SINR. The method further may include generating a regression model based at least in part on the plurality of wireless connection datasets. The regression model is configured to determine an estimated SINR based on the at least one measured environment parameter. The method further may include training an SINR optimization machine learning algorithm to determine an optimized estimated SINR based at least in part on the estimated SINR.

In another aspect of the present disclosure, collecting the plurality of wireless connection datasets further may include receiving the plurality of wireless connection datasets from one or more wireless devices. The at least one measured environment parameter of each of the plurality of wireless connection datasets includes at least one of: a channel quality indication (CQI) value, a weather condition value, and an environment complexity value.

In another aspect of the present disclosure, the environment complexity value quantifies at least one of: a number of obstacles and an average height of obstacles which are obstructive to wireless transmissions.

In another aspect of the present disclosure, the environment complexity value is determined by each of the one or more wireless devices using an environment complexity identification machine learning model.

In another aspect of the present disclosure, the one or more wireless devices includes at least a vehicle equipped with a vehicle communication system.

In another aspect of the present disclosure, training the SINR optimization machine learning algorithm further may include determining a plurality of tested SINR deviations between the estimated SINR determined by the regression model and the measured SINR in each of the plurality of wireless connection datasets. Training the SINR optimization machine learning algorithm further may include training the SINR optimization machine learning algorithm based at least in part on the plurality of tested SINR deviations. The SINR optimization machine learning algorithm is trained to receive the at least one measured environment parameter and the estimated SINR as an input and provide the optimized estimated SINR as an output.

In another aspect of the present disclosure, training the SINR optimization machine learning algorithm further may include training the SINR optimization machine learning algorithm to account for edge cases using a plurality of simulated wireless network environments.

In another aspect of the present disclosure, training the SINR optimization machine learning algorithm to account for edge cases using a plurality of simulated wireless network environments further may include generating a plurality of simulated wireless network environments using a computer simulation. Training the SINR optimization machine learning algorithm to account for edge cases using a plurality of simulated wireless network environments further may include training the SINR optimization machine learning algorithm based at least in part on the plurality of simulated wireless network environments.

In another aspect of the present disclosure, generating the plurality of simulated wireless network environments further may include initializing the plurality of simulated wireless network environments. Each of the plurality of the simulated wireless network environments is defined by at least one simulated environment parameter. Generating the plurality of simulated wireless network environments further may include adding a plurality of simulated wireless nodes to each of the plurality of simulated wireless network environments to form a plurality of simulated wireless network environments. Generating the plurality of simulated wireless network environments further may include measuring one or more simulated SINRs within each of the plurality of simulated wireless network environments.

In another aspect of the present disclosure, training the SINR optimization machine learning algorithm based at least in part on the plurality of simulated wireless network environments further may include determining one or more estimated SINRs for each of the plurality of simulated wireless network environments using the regression model based at least in part on the at least one simulated environment parameter of each of the plurality of simulated wireless network environments. Training the SINR optimization machine learning algorithm based at least in part on the plurality of simulated wireless network environments further may include comparing the one or more estimated SINRs to the one or more simulated SINRs for each of the plurality of simulated wireless network environments to determine a plurality of simulated SINR deviations. Training the SINR optimization machine learning algorithm based at least in part on the plurality of simulated wireless network environments further may include training the SINR optimization machine learning algorithm based at least in part on the at least one simulated environment parameter of each of the plurality of simulated wireless network environments and the plurality of simulated SINR deviations.

According to several aspects, a system for estimating signal to interference and noise ratio (SINR) in a wireless network environment is provided. The system may include a plurality of wireless nodes. The system further may include one or more central computers in electrical communication with the plurality of wireless nodes. The one or more central computers are programmed to collect a plurality of wireless connection datasets about the wireless network environment using the plurality of wireless nodes. Each of the plurality of wireless connection datasets includes at least one measured environment parameter and a measured SINR. The one or more central computers are further programmed to generate a regression model based at least in part on the plurality of wireless connection datasets. The regression model is configured to determine an estimated SINR based on the at least one measured environment parameter. The one or more central computers are further programmed to train an SINR optimization machine learning algorithm to determine an optimized estimated SINR based at least in part on the estimated SINR.

In another aspect of the present disclosure, to collect the plurality of wireless connection datasets, the one or more central computers are further programmed to receive the plurality of wireless connection datasets from the plurality of wireless nodes. The plurality of wireless connection datasets are collected by one or more wireless devices in wireless communication with the plurality of wireless nodes. The one or more wireless devices includes at least a vehicle equipped with a vehicle communication system. The at least one measured environment parameter of each of the plurality of wireless connection datasets includes at least one of: a channel quality indication (CQI) value, a weather condition value, and an environment complexity value.

In another aspect of the present disclosure, to train the SINR optimization machine learning algorithm, the one or more central computers are further programmed to determine a plurality of tested SINR deviations between the estimated SINR determined by the regression model and the measured SINR in each of the plurality of wireless connection datasets. To train the SINR optimization machine learning algorithm, the one or more central computers are further programmed to train the SINR optimization machine learning algorithm based at least in part on the plurality of tested SINR deviations. The SINR optimization machine learning algorithm is trained to receive the at least one measured environment parameter and the estimated SINR as an input and provide the optimized estimated SINR as an output.

In another aspect of the present disclosure, to train the SINR optimization machine learning algorithm, the one or more central computers are further programmed to train the SINR optimization machine learning algorithm to account for edge cases using a plurality of simulated wireless network environments.

In another aspect of the present disclosure, to train the SINR optimization machine learning algorithm to account for edge cases using the plurality of simulated wireless network environments, the one or more central computers are further programmed to generate a plurality of simulated wireless network environments using a computer simulation. To train the SINR optimization machine learning algorithm to account for edge cases using the plurality of simulated wireless network environments, the one or more central computers are further programmed to train the SINR optimization machine learning algorithm based at least in part on the plurality of simulated wireless network environments.

In another aspect of the present disclosure, to generate the plurality of simulated wireless network environments, the one or more central computers are further programmed to initialize the plurality of simulated wireless network environments. Each of the plurality of the simulated wireless network environments is defined by at least one simulated environment parameter. The at least one simulated environment parameter for each of the plurality of the simulated wireless network environments is determined by sampling from a plurality of probability distributions corresponding to each of the at least one simulated environment parameter. To generate the plurality of simulated wireless network environments, the one or more central computers are further programmed to add a plurality of simulated wireless nodes to each of the plurality of simulated wireless network environments to form a plurality of simulated wireless network environments. To generate the plurality of simulated wireless network environments, the one or more central computers are further programmed to measure one or more simulated SINRs within each of the plurality of simulated wireless network environments.

In another aspect of the present disclosure, to train the SINR optimization machine learning algorithm based at least in part on the plurality of simulated wireless network environments, the one or more central computers are further programmed to determine one or more estimated SINRs for each of the plurality of simulated wireless network environments using the regression model based at least in part on the at least one simulated environment parameter of each of the plurality of simulated wireless network environments. To train the SINR optimization machine learning algorithm based at least in part on the plurality of simulated wireless network environments, the one or more central computers are further programmed to compare the one or more estimated SINRs to the one or more simulated SINRs for each of the plurality of simulated wireless network environments to determine a plurality of simulated SINR deviations. To train the SINR optimization machine learning algorithm based at least in part on the plurality of simulated wireless network environments, the one or more central computers are further programmed to train the SINR optimization machine learning algorithm based at least in part on the at least one simulated environment parameter of each of the plurality of simulated wireless network environments and the plurality of simulated SINR deviations.

According to several aspects, a method for estimating signal to interference and noise ratio (SINR) in a wireless network environment is provided. The method may include receiving a plurality of wireless connection datasets from one or more wireless devices. Each of the plurality of wireless connection datasets includes at least one measured environment parameter and a measured SINR. The at least one measured environment parameter of each of the plurality of wireless connection datasets includes at least one of: a channel quality indication (CQI) value, a weather condition value, and an environment complexity value. The method further may include generating a regression model based at least in part on the plurality of wireless connection datasets. The regression model is configured to determine an estimated SINR based on the at least one measured environment parameter. The method further may include determining a plurality of tested SINR deviations between the estimated SINR determined by the regression model and the measured SINR in each of the plurality of wireless connection datasets. The method further may include training an SINR optimization machine learning algorithm based at least in part on the plurality of tested SINR deviations. The SINR optimization machine learning algorithm is trained to receive the at least one measured environment parameter and the estimated SINR as an input and provide an optimized estimated SINR as an output.

In another aspect of the present disclosure, training the SINR optimization machine learning algorithm further may include generating a plurality of simulated wireless network environments using a computer simulation. Training the SINR optimization machine learning algorithm further may include training the SINR optimization machine learning algorithm to account for edge cases based at least in part on the plurality of simulated wireless network environments.

In another aspect of the present disclosure, training the SINR optimization machine learning algorithm based at least in part on the plurality of simulated wireless network environments further may include determining one or more estimated SINRs for each of the plurality of simulated wireless network environments using the regression model based at least in part on at least one simulated environment parameter of each of the plurality of simulated wireless network environments. Training the SINR optimization machine learning algorithm based at least in part on the plurality of simulated wireless network environments further may include comparing the one or more estimated SINRs to one or more simulated SINRs for each of the plurality of simulated wireless network environments to determine a plurality of simulated SINR deviations. Training the SINR optimization machine learning algorithm based at least in part on the plurality of simulated wireless network environments further may include training the SINR optimization machine learning algorithm based at least in part on the at least one simulated environment parameter of each of the plurality of simulated wireless network environments and the plurality of simulated SINR deviations.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

In aspects of the present disclosure, variance in environmental conditions, including, for example, the presence of tall buildings and fluctuations in a number of connected devices (e.g., connected vehicles) may result in variation in signal to interference and noise ratios, even across relatively small geographical areas. Accordingly, the present disclosure provides a new and improved system and method for SINR estimation, allowing for estimation of SINR on a high-resolution, local level.

The following description is merely exemplary in nature and is not intended to limit the present disclosure, application, or uses.

Figure 1:
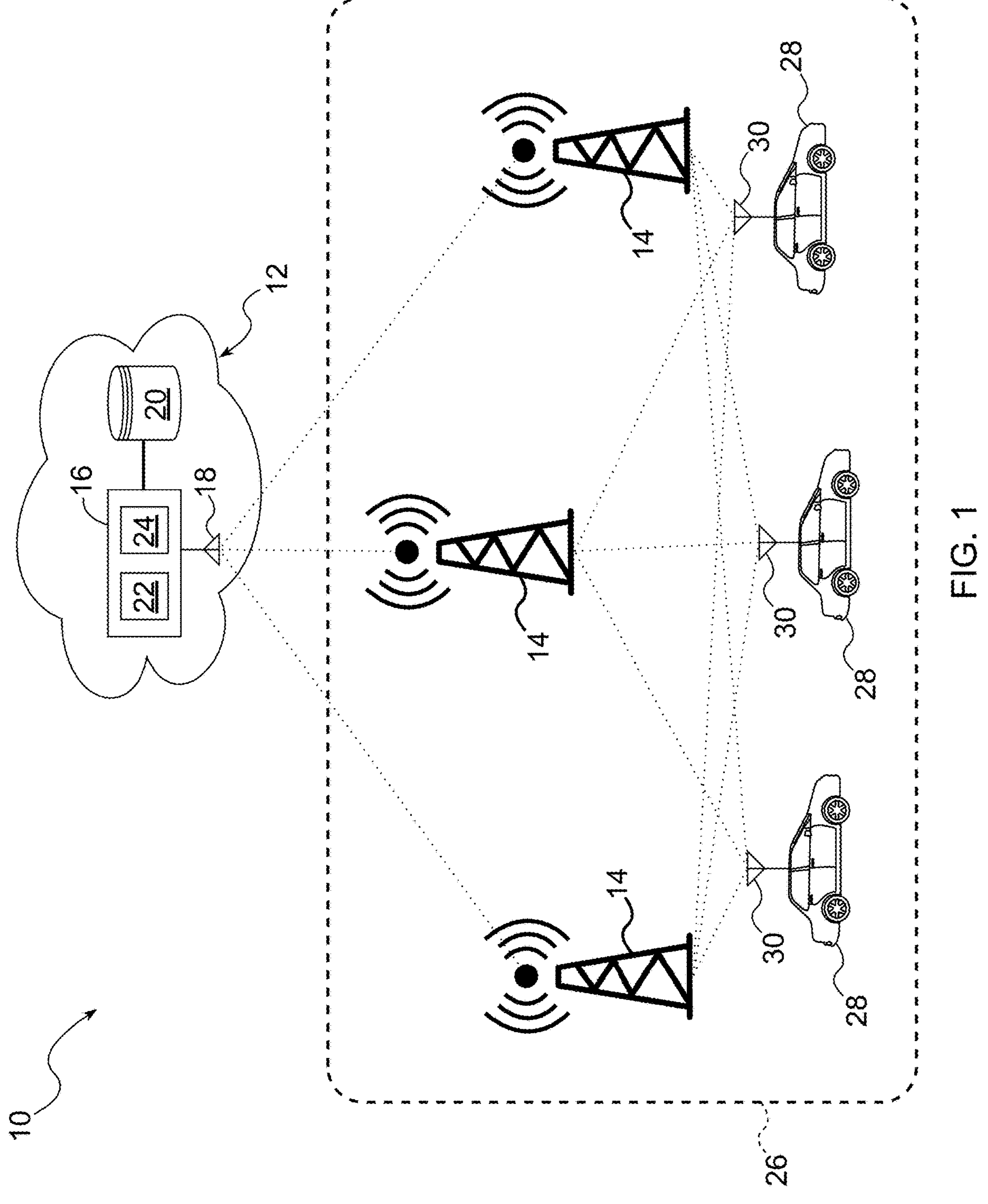
FIG. 1 is a schematic diagram of a system for estimating signal to interference and noise ratio (SINR) in a wireless network environment, according to an exemplary embodiment.

Referring to FIG. 1, a system for estimating signal to interference and noise ratio (SINR) in a wireless network environment is illustrated and generally indicated by reference number 10. The system 10 generally includes one or more central computers 12 and a plurality of wireless nodes 14.

The one or more central computers 12 are used to implement a method 100 for estimating signal to interference and noise ratio (SINR) in a wireless network environment, as will be described below. The one or more central computers 12 include at least one controller 16, a central computer communication system 18, and a database 20.

The controller 16 includes at least one processor 22 and a non-transitory computer readable storage device or media 24. The processor 22 may be a custom made or commercially available processor, a central processing unit (CPU), a graphics processing unit (GPU), an auxiliary processor among several processors associated with the one or more central computers 12, a semiconductor-based microprocessor (in the form of a microchip or chip set), a macroprocessor, a combination thereof, or generally a device for executing instructions.

The computer readable storage device or media 24 may include volatile and nonvolatile storage in read-only memory (ROM), random-access memory (RAM), and keep-alive memory (KAM), for example. KAM is a persistent or non-volatile memory that may be used to store various operating variables while the processor 22 is powered down. The computer-readable storage device or media 24 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the one or more central computers 12 to perform the method 100.

The central computer communication system 18 is used by the controller 16 to communicate with other systems external to the one or more central computers 12. For example, the central computer communication system 18 includes capabilities for communication with vehicles ("V2I" communication). In certain embodiments, the central computer communication system 18 is a wireless communication system configured to communicate via a wireless local area network (WLAN) using IEEE 802.11 standards or by using cellular data communication (e.g., using GSMA standards, such as, for example, SGP.02, SGP.22, SGP.32, and the like). Accordingly, the central computer communication system 18 may further include an embedded universal integrated circuit card (eUICC) configured to store at least one cellular connectivity configuration profile, for example, an embedded subscriber identity module (eSIM) profile. The central computer communication system 18 is further configured to communicate via a personal area network (e.g., BLUETOOTH), near-field communication (NFC), and/or any additional type of radiofrequency communication.

Accordingly, the central computer communication system 18 may include one or more antennas and/or communication transceivers for receiving and/or transmitting signals. The central computer communication system 18 is configured to wirelessly communicate information between the one or more central computers 12 and external communication networks, such as, for example, the internet. The central computer communication system 18 is in electrical communication with the controller 16. It should be understood that the central computer communication system 18 may be integrated with the one or more central computers 12 (e.g., on a same circuit board with the one or more central computers 12 or otherwise a part of the one or more central computers 12) without departing from the scope of the present disclosure.

The database 20 is used to store information about the SINR in the wireless network environment, as will be discussed in greater detail below. In an exemplary embodiment, the database 20 includes one or more mass storage devices, such as, for example, hard disk drives, magnetic tape drives, magneto-optical disk drives, optical disks, solid-state drives, and/or additional devices operable to store data in a persisting and machine-readable fashion. In some examples, the one or more mass storage devices may be configured to provide redundancy in case of hardware failure and/or data corruption, using, for example, a redundant array of independent disks (RAID). In a non-limiting example, the controller 16 may execute software such as, for example, a database management system (DBMS), allowing data stored on the one or more mass storage devices to be organized and accessed. The database 20 is in electrical communication with the controller 16.

The controller 16 is in electrical communication with the central computer communication system 18 and the database 20. In an exemplary embodiment, the electrical communication is established using, for example, a CAN network, a FLEXRAY network, a local area network (e.g., WiFi, ethernet, and the like), a serial peripheral interface (SPI) network, or the like. It should be understood that various additional wired and wireless techniques and communication protocols for communicating with the controller 16 are within the scope of the present disclosure.

The plurality of wireless nodes 14 are wireless telecommunications nodes. In the scope of the present disclosure, a wireless node is a site including electronic communications equipment (e.g., antennas, transceivers, digital signal processors, control electronics, and/or the like) configured to connect user equipment (UE) to a wireless network (e.g., a cellular network). In the scope of the present disclosure, UE includes, for example, wireless devices, mobile devices (e.g., cellular telephones, smartphones, laptops, and/or the like), internet of things (IoT) devices, connected vehicles, and/or the like.

In an exemplary embodiment, each of the plurality of wireless nodes 14 includes one or more antennas and a base transceiver station (BTS). The one or more antennas are used to transmit and receive signals to and from the UE. The one or more antennas may include various types of antennas, for example, dipole antennas, such as dipole turnstile antennas, dipole corner reflector antennas, and dipole microstrip antennas. The one or more antennas may also include monopole antennas, such as monopole whip antennas. It should be understood that many additional types of antennas, such as array antennas, loop antennas, and aperture antennas may be used to transmit and receive radio signals to and from the UE without departing from the scope of the present disclosure.

The base transceiver station (BTS) is used to receive and transmit radiofrequency (RF) signals using the one or more antennas. In a non-limiting example, the BTS includes one or more RF transceivers, each of the one or more RF transceivers supporting a plurality of concurrent connections with UE. In another non-limiting example, the BTS may further include additional signal processing equipment such as, for example, equipment for encrypting and/or decrypting communications, spectral filters, multiplexers, amplifiers, and/or the like. In an exemplary embodiment, the BTS is in electrical communication with a core network infrastructure. In a non-limiting example, the connection to the core network infrastructure may be established using, for example, fiber optics, microwave links, satellite links, and/or the like. The connection between the each of the plurality of wireless nodes 14 and the core network infrastructure is sometimes referred to as a backhaul connection. In the scope of the present disclosure, the core network infrastructure is a central infrastructure which manages and routes network traffic from the UE across a wide area network (WAN), including, for example, a mobile switching center (MSC), an internet backbone, and/or the like.

In a non-limiting example, the plurality of wireless nodes 14 are gNodeB (next generation Node B) cellular network base stations configured to provide access to a 5G cellular network. It should be understood that the plurality of wireless nodes 14 may be other types of telecommunications nodes, including, for example, NodeB (i.e., 3G cellular network base stations), eNodeB (i.e., 4G cellular network base stations), WiFi access points, and/or the like.

The plurality of wireless nodes 14 are defined by a plurality of real node parameters. In an exemplary embodiment, the plurality of real node parameters includes, for example, a real node quantity of the plurality of wireless nodes 14 (e.g., three nodes, as shown in FIG. 1), a real node location for each of the plurality of wireless nodes 14 (i.e., a location of each of the plurality of wireless nodes 14 within the environment), a real node power level for each of the plurality of wireless nodes 14 (i.e., a radio transmission power of each of the plurality of wireless nodes 14 measured in, for example, watts), and a real node beamforming configuration for each of the plurality of wireless nodes 14 (i.e., operational settings employed for beamforming enabling each of the plurality of wireless nodes 14 to focus the transmission or reception of RF signals in a particular direction).

The plurality of wireless nodes 14 are operating within a wireless network environment 26. It should be understood that a signal to interference and noise ratio (SINR) may vary within the wireless network environment 26 depending on obstructions within the wireless network environment 26. In the present disclosure, the system 10 and method 100 are used to estimate the SINR in the wireless network environment 26, as will be discussed in greater detail below.

With continued reference to FIG. 1, the plurality of wireless nodes 14 are in electrical communication with the central computer communication system 18 of the one or more central computers 12. Accordingly, the one or more central computers 12 may use the central computer communication system 18 to adjust one or more of the plurality of real node parameters, such as, for example, the real node power level and/or the real node beamforming configuration of each of the plurality of wireless nodes 14. Furthermore, the one or more central computers 12 may use the central computer communication system 18 to receive status information from the plurality of wireless nodes 14, as will be discussed in greater detail below.

The plurality of wireless nodes 14 are also in electrical communication with a plurality of vehicles 28. In the scope of the present disclosure, the plurality of vehicles 28 are considered to be UE in the wireless network environment 26 in communication with the plurality of wireless nodes 14. Each of the plurality of vehicles 28 includes a vehicle communication system 30 allowing communication between vehicle systems, such as, for example, a vehicle controller, and the plurality of wireless nodes 14. In an exemplary embodiment, the plurality of vehicles 28 are distributed throughout the wireless network environment 26, and thus may experience differing SINR. The quantity of the plurality of vehicles 28 and the volume and type of network traffic transmitted and/or received by each of the plurality of vehicles 28 affect the environment traffic density of the wireless network environment 26.

Figure 2:
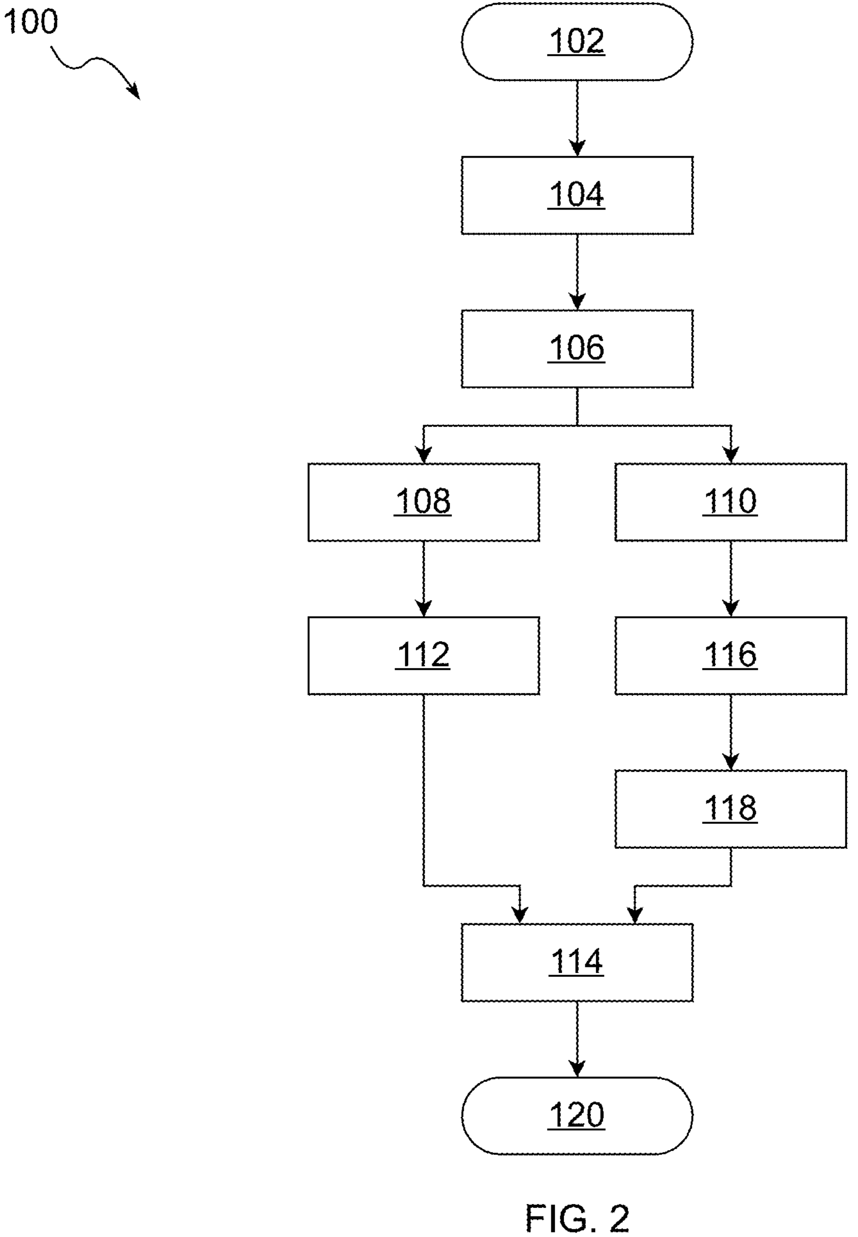
FIG. 2 is a flowchart of a method for estimating signal to interference and noise ratio (SINR) in a wireless network environment, according to an exemplary embodiment.

Referring to FIG. 2, a flowchart of the method 100 for estimating signal to interference and noise ratio (SINR) in a wireless network environment is shown. The method 100 begins at block 102 and proceeds to block 104. At block 104, the one or more central computers 12 collect a plurality of wireless connection datasets about the wireless network environment 26 from the UE (i.e., the plurality of vehicles 28). In an exemplary embodiment, the one or more central computers 12 uses the plurality of wireless nodes 14 to collect the plurality of wireless connection datasets. In a non-limiting example, each of the plurality of vehicles 28 transmits at least one wireless connection dataset to the plurality of wireless nodes 14. The plurality of wireless nodes 14 subsequently transmit the plurality of wireless connection datasets to the one or more central computers 12 via the central computer communication system 18. The one or more central computers 12 store the plurality of wireless connection datasets in the database 20.

In the scope of the present disclosure, a wireless connection dataset includes at least one measured environment parameter and a measured SINR. The at least one measured environment parameter includes at least one of: a channel quality indication (CQI) value, a weather condition value, an environment complexity value, and a communication distance. The CQI value quantifies a level of interference, noise, and signal quality for a wireless connection between one of the plurality of vehicles 28 and the plurality of wireless nodes 14. The weather condition value quantifies a weather condition (e.g., temperature, humidity, precipitation, storm, fog, smoke, and/or the like) near one of the plurality of vehicles 28. The environment complexity value quantifies at least one of: a number of obstacles and an average height of obstacles which are obstructive to wireless transmissions near one of the plurality of vehicles 28. Obstacles which are obstructive to wireless transmissions may include, for example, buildings, walls, metal structures, trees, dense foliage, natural terrain (e.g., hills, valleys, etc.), and/or the like. The communication distance quantifies a distance between one of the plurality of vehicles 28 and one or more of the plurality of wireless nodes 14. The measured SINR is a signal to interference and noise ratio (SINR) measured by one of the plurality of vehicles 28.

In an exemplary embodiment, to determine the environment complexity value, each of the plurality of vehicles 28 uses an environment complexity identification machine learning model. In a non-limiting example, the environment complexity identification machine learning model includes multiple layers, including an input layer and an output layer, as well as one or more hidden layers. The input layer receives environment data (e.g., geographical location data, elevation data, map data, construction data, property zoning data, a number of obstacles and an average height of obstacles which are obstructive to wireless transmissions, and/or the like) as an input. The input is then passed on to the hidden layers. Each hidden layer applies a transformation (e.g., a non-linear transformation) to the data and passes the result to the next hidden layer until the final hidden layer. The output layer produces the environment complexity value.

To train the environment complexity identification machine learning model, a dataset of inputs and their corresponding environment complexity value is used. The algorithm is trained by adjusting internal weights between nodes in each hidden layer to minimize prediction error. During training, an optimization technique (e.g., gradient descent) is used to adjust the internal weights to reduce the prediction error. The training process is repeated with the entire dataset until the prediction error is minimized, and the resulting trained model is then used to classify new input data.

After sufficient training of the environment complexity identification machine learning model, the algorithm is capable of accurately and precisely determining environment complexity value based on environment data. By adjusting the weights between the nodes in each hidden layer during training, the algorithm "learns" to recognize patterns in the environment data which are indicative of environment complexity value. After block 104, the method 100 proceeds to block 106.

At block 106, the one or more central computers 12 generate a regression model based at least in part on the plurality of wireless connection datasets collected at block 104. The regression model is configured to determine an estimated SINR based on the at least one measured environment parameter of each of the plurality of wireless connection datasets collected at block 104. In a non-limiting example, the regression model is generated using a preprocessing step, an algorithm selection step, a data splitting step, and a training step.

In the preprocessing step, the one or more central computers 12 cleans the plurality of wireless connection datasets collected at block 104. In a non-limiting example, the preprocessing step includes normalization and data cleaning to handle missing values and outliers.

In the algorithm selection step, the one or more central computers 12 selects an appropriate regression algorithm based on the plurality of wireless connection datasets. In a non-limiting example, the regression algorithm may include a linear regression, a logistic regression, a ridge regression, a lasso regression, a polynomial regression, or machine learning-based models like a multiple regression or a support vector regression. In an exemplary embodiment, the regression algorithm is selected based on characteristics of the plurality of wireless connection datasets. For example, linear regression may be chosen when there is a linear relationship between the at least one measured environment parameter and the measured SINR. If the relationship between the at least one measured environment parameter and the measured SINR is non-linear, the polynomial regression may be chosen.

In the data splitting step, the plurality of wireless connection datasets are divided into two parts: a training set and a testing set. The training set is used to train the regression model and the testing set is used to evaluate the performance of the regression model, as will be discussed in greater detail below. In a non-limiting example, the plurality of wireless connection datasets are divided randomly to ensure that both the training set and the testing set are representative of the entire dataset.

In the training step, the one or more central computers 12 train the regression algorithm selected during the algorithm selection step. In an exemplary embodiment, parameters of the selected regression algorithm are adjusted to minimize a difference between the estimated SINR determined by the regression model based on the training set and the measured SINR in the training set. In a non-limiting example, the parameters are adjusted using iterative optimization, gradient descent, and/or additional optimization techniques. The training step continues until the regression algorithm reaches a predetermined accuracy level and/or until convergence.

After completion of the training step, the regression model may be used to determine estimated SINR based on measured environment parameters. After block 106, the method 100 proceeds to blocks 108 and 110.

At block 108, the one or more central computers 12 runs the regression model generated at block 106 using the at least one measured environment parameter of each of the plurality of wireless connection datasets in the testing set to determine one or more estimated SINRs. In a non-limiting example, the one or more estimated SINRs are saved in the database 20. After block 108, the method 100 proceeds to block 112.

At block 112, the one or more central computers 12 determines a plurality of tested SINR deviations between each of the one or more estimated SINRs determined at block 108 and the measured SINR in each of the plurality of wireless connection datasets in the testing set. In a non-limiting example, the plurality of tested SINR deviations are saved in the database 20. After block 112, the method proceeds to block 114, as will be discussed in greater detail below.

Figure 3:
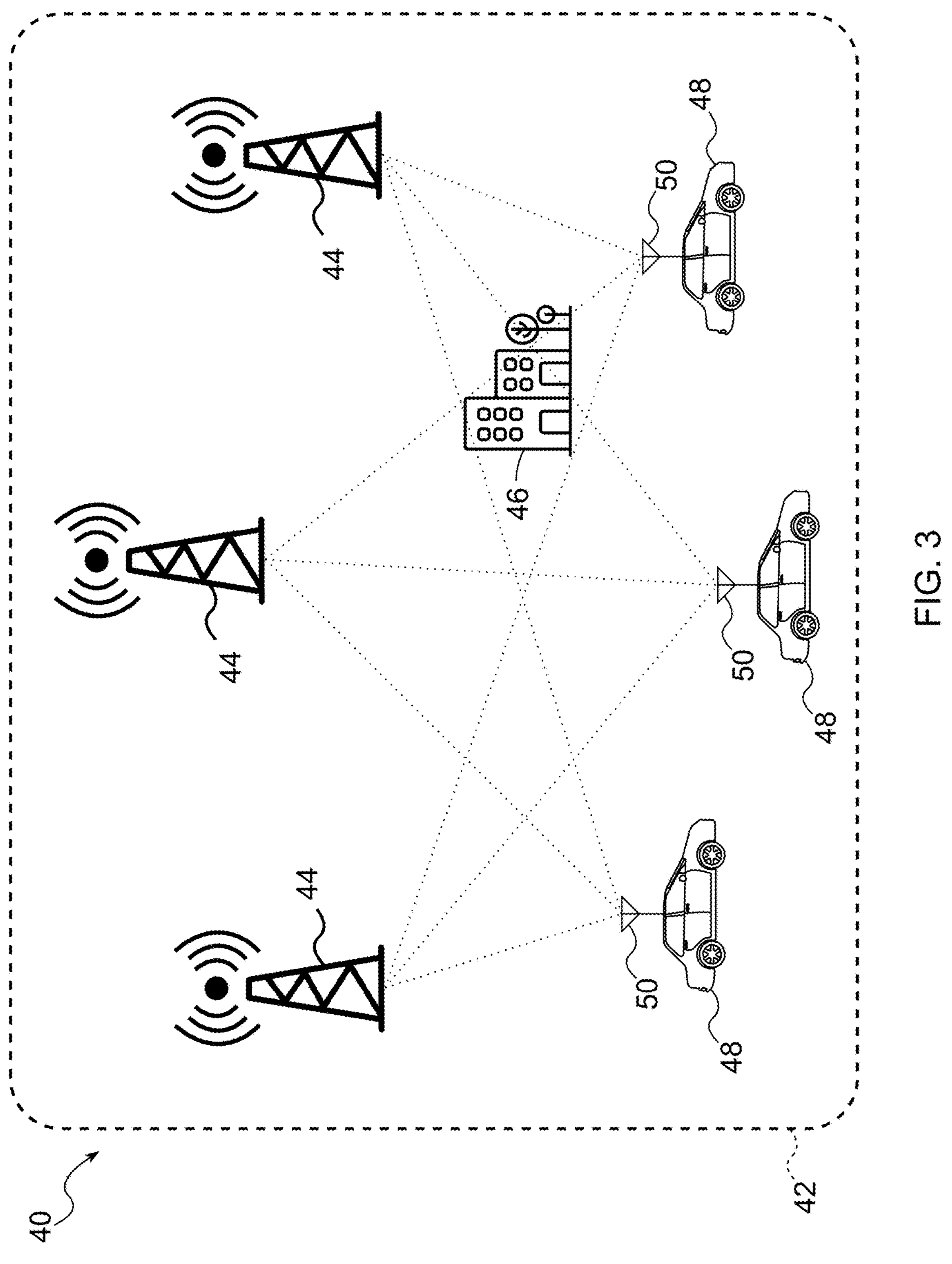
FIG. 3 is a schematic diagram of a simulated wireless network for a computer simulation, according to an exemplary embodiment.

Referring to FIG. 3, a schematic diagram of a simulated wireless network 40 for a computer simulation is shown. The simulated wireless network 40 includes a simulated wireless network environment 42 and a plurality of simulated wireless nodes 44. The simulated wireless network environment 42 is defined by at least one simulated environment parameter. In an exemplary embodiment, the at least one simulated environment parameter includes, for example, a simulated environment size (e.g., one hundred square kilometers), a simulated environment traffic density, and one or more simulated obstructions 46. In the scope of the present disclosure, the simulated environment traffic density models a quantity of a plurality of simulated vehicles 48 in the simulated wireless network environment 42 and a wireless traffic volume of the plurality of simulated vehicles 48 in the simulated wireless network environment 42. Each of the plurality of simulated vehicles 48 has a vehicle wireless communication system 50 in wireless electrical communication with one or more of the plurality of simulated wireless nodes 44. The one or more simulated obstructions 46 model obstacles which are obstructive to wireless transmissions (e.g., buildings, public infrastructure, and/or the like).

The plurality of simulated wireless nodes 44 model wireless telecommunications nodes. In the scope of the present disclosure, a wireless node is a site including electronic communications equipment (e.g., antennas, transceivers, digital signal processors, control electronics, and/or the like) configured to connect user equipment (UE) to a wireless network (e.g., a cellular network), as discussed above.

The plurality of simulated wireless nodes 44 are defined by a plurality of simulated node parameters. In an exemplary embodiment, the plurality of simulated node parameters includes, for example, a quantity of the plurality of simulated wireless nodes 44 (e.g., three nodes, as shown in FIG. 3), a simulated node location for each of the plurality of simulated wireless nodes 44 (i.e., a location of each of the plurality of simulated wireless nodes 44 within the simulated wireless network environment 42), and a simulated node power level for each of the plurality of simulated wireless nodes 44 (i.e., a radio transmission power of each of the plurality of simulated wireless nodes measured in, for example, watts). The simulated wireless network environment 42 including the plurality of simulated wireless nodes 44 is referred to as the simulated wireless network 40.

Referring again to FIG. 2 and with continued reference to FIG. 3, at block 110, the one or more central computers 12 generates a plurality of simulated wireless network environments 42 using the computer simulation. To generate one of the plurality of simulated wireless network environments 42, the one or more central computers 12 first initialize the simulated wireless network environment 42. As discussed above, the simulated wireless network environment 42 is defined by the at least one simulated environment parameter.

In an exemplary embodiment, the at least one simulated environment parameter defining the simulated wireless network environment 42 is chosen by sampling from a plurality of probability distributions corresponding to each of the plurality of environment parameters. For example, the plurality of probability distributions includes an environment size probability distribution, an environment traffic density probability distribution, and an obstruction probability distribution. In a non-limiting example, the one or more central computers 12 uses Monte Carlo sampling methods to ensure that such that corner and edge cases are considered.

After initializing the simulated wireless network environment 42, the one or more central computers 12 adds the plurality of simulated wireless nodes 44 to the simulated wireless network environment 42. In an exemplary embodiment, the plurality of simulated node parameters are chosen by sampling from a plurality of probability distributions corresponding to each of the plurality of node parameters. For example, the plurality of probability distributions includes a node quantity probability distribution, a node location probability distribution, and a node power level probability distribution. In a non-limiting example, the one or more central computers 12 uses Monte Carlo sampling methods to ensure that such that corner and edge cases are considered.

After adding the plurality of simulated wireless nodes 44 to the simulated wireless network environment 42, the one or more central computers 12 measures one or more simulated SINRs within the simulated wireless network environment 42. In an exemplary embodiment, to measure the one or more simulated SINRs, the one or more central computers 12 simulates network traffic between the plurality of simulated vehicles 48 and the plurality of simulated wireless nodes 44. During the network traffic simulation, the one or more central computers 12 measure one or more simulated SINRs within the simulated wireless network environment 42. In a non-limiting example, the one or more central computers 12 may perform a simulated video upload task where each of the plurality of simulated vehicles 48 attempt to upload a high-definition video to the plurality of simulated wireless nodes 44. The one or more central computers 12 evaluate the one or more simulated SINRs based on simulated interaction between simulated network transmissions and the one or more simulated obstructions 46 in the simulated wireless network environment 42. It should be understood that the above process for generating one of the plurality of simulated wireless network environments 42 is repeated multiple times to generate the plurality of simulated wireless network environments 42. The at least one simulated environment parameter and the plurality of simulated node parameters are varied to provide coverage of corner and/or edge cases. After block 110, the method 100 proceeds to block 116.

At block 116, the one or more central computers 12 runs the regression model generated at block 106 for each of the plurality of simulated wireless network environments 42 using at least one simulated environment parameter of each of the plurality of simulated wireless network environments 42 to determine one or more estimated SINRs for each of the plurality of simulated wireless network environments 42. In a non-limiting example, the one or more estimated SINRs are saved in the database 20 with the one or more estimated SINRs determined at block 108. After block 116, the method 100 proceeds to block 118.

At block 118, the one or more central computers 12 determines a plurality of simulated SINR deviations by comparing the one or more estimated SINRs for each of the plurality of simulated wireless network environments 42 determined at block 116 and the one or more simulated SINRs measured within the simulated wireless network environment 42 at block 110. In a non-limiting example, the plurality of simulated SINR deviations are saved in the database 20 along with plurality of tested SINR deviations determined at block 112. After block 118, the method proceeds to block 114.

At block 114, the one or more central computers 12 train an SINR optimization machine learning algorithm. In the scope of the present disclosure, the SINR optimization machine learning algorithm is used to increase the accuracy of the SINR estimation by compensating for errors introduced by the regression model and producing an optimized estimated SINR as an output. In a non-limiting example, the SINR optimization machine learning algorithm is trained to account for edge and/or corner cases which may be underrepresented in the plurality of wireless connection datasets. In a non-limiting example, the SINR optimization machine learning algorithm is trained based on the one or more estimated SINRs of each of the plurality of wireless connection datasets in the testing set, the plurality of tested SINR deviations determined at block 112, the one or more estimated SINRs for each of the plurality of simulated wireless network environments 42, the plurality of simulated SINR deviations determined at block 118, the at least one measured environment parameter of each of the plurality of wireless connection datasets, the at least one simulated environment parameter of each of the plurality of simulated wireless network environments, the measured SINR of each of the plurality of wireless datasets, and the simulated SINR of each of the plurality of simulated wireless network environments.

In a non-limiting example, the SINR optimization machine learning algorithm includes multiple layers, including an input layer and an output layer, as well as one or more hidden layers. The input layer receives the one or more estimated SINRs of each of the plurality of wireless connection datasets in the testing set, the plurality of tested SINR deviations determined at block 112, the one or more estimated SINRs for each of the plurality of simulated wireless network environments 42, the plurality of simulated SINR deviations determined at block 118, the at least one measured environment parameter of each of the plurality of wireless connection datasets, and the at least one simulated environment parameter of each of the plurality of simulated wireless network environments as inputs. The inputs are then passed on to the hidden layers. Each hidden layer applies a transformation (e.g., a non-linear transformation) to the data and passes the result to the next hidden layer until the final hidden layer. The output layer produces the optimized estimated SINR.

To train the SINR optimization machine learning algorithm, a dataset of inputs and their corresponding optimized estimated SINR (i.e., the measured SINR of each of the plurality of wireless datasets and the simulated SINR of each of the plurality of simulated wireless network environments) is used. The algorithm is trained by adjusting internal weights between nodes in each hidden layer to minimize prediction error. During training, an optimization technique (e.g., gradient descent) is used to adjust the internal weights to reduce the prediction error. The training process is repeated with the entire dataset until the prediction error is minimized, and the resulting trained algorithm is then used to produce the optimized estimated SINR based on new input data.

After sufficient training of the SINR optimization machine learning algorithm, the algorithm is capable of accurately and precisely determining the optimized estimated SINR based on the plurality of tested SINR deviations, the plurality of simulated SINR deviations, the at least one measured environment parameter of each of the plurality of wireless connection datasets, the at least one simulated environment parameter of each of the plurality of simulated wireless network environments, the measured SINR of each of the plurality of wireless datasets and the simulated SINR of each of the plurality of simulated wireless network environments. By adjusting the weights between the nodes in each hidden layer during training, the algorithm "learns" to recognize patterns in the data that are indicative of the optimized estimated SINR. After block 114, the method 100 proceeds to enter a standby state at block 120.

In an exemplary embodiment, the one or more central computers 12 repeatedly exit the standby state 120 and restart the method 100 at block 102. In a non-limiting example, the one or more central computers 12 exit the standby state 120 and restart the method 100 on a timer, for example, every three hundred milliseconds.

Figure 4:
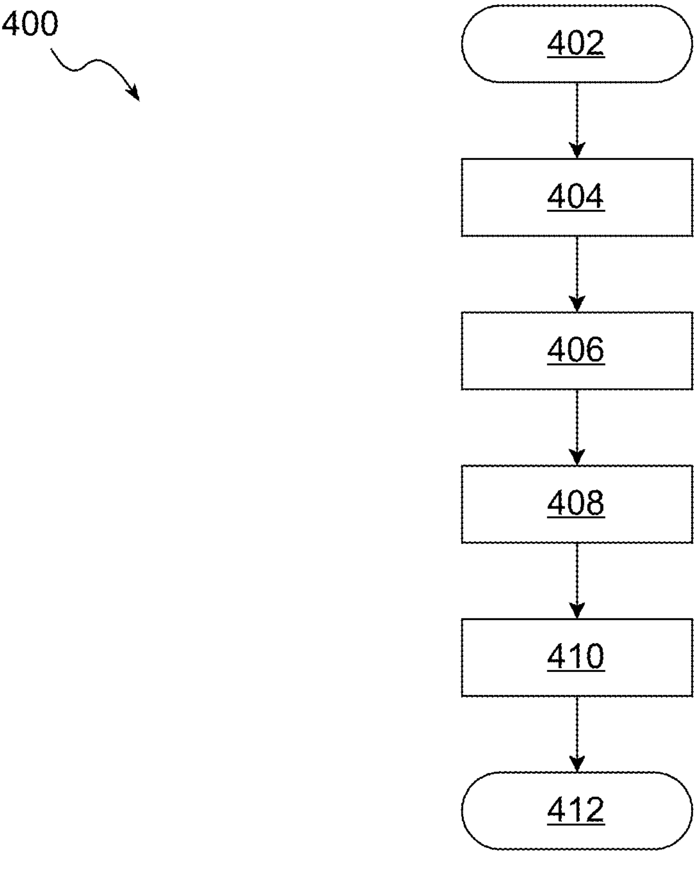
FIG. 4 is a flowchart of a method for using a regression model and an SINR optimization machine learning algorithm, according to an exemplary embodiment.

Referring to FIG. 4, a flowchart of a method 400 for using the regression model generated at block 106 and the SINR optimization machine learning algorithm trained at block 114 is shown. In an exemplary embodiment, the method 400 is performed by the one or more central computers 12. In another exemplary embodiment, the method 400 is performed by another computer system, such as, for example the vehicle controller of one or more of the plurality of vehicles 28. The method 400 begins at block 402 and proceeds to block 404. At block 404, at least one measured environment parameter is collected. In an exemplary embodiment, the at least one measured environment parameter is determined using sensors, including, for example, vehicle sensors configured to measure at least one of: a channel quality indication (CQI) value, a weather condition value, an environment complexity value, and a communication distance. After block 404, the method 400 proceeds to block 406.

At block 406, the regression model generated at block 106 is executed using the at least one measured environment parameter collected at block 404 to determine an estimated SINR. After block 406, the method 400 proceeds to block 408.

At block 408, the SINR optimization machine learning algorithm is executed using the at least one measured environment parameter and the estimated SINR as input to produce an optimized estimated SINR as output. After block 408, the method 400 proceeds to block 410.

At block 410, the optimized estimated SINR is used to improve operation of a wireless communication system. In an exemplary embodiment, the wireless communication system is the vehicle communication system 30. In a non-limiting example, transmission parameters such as, for example, transmission power, beamforming parameters, and/or the like may be adjusted, based on the optimized estimated SINR. In another non-limiting example, the vehicle controller may delay or expediate transmission of critical data based on the optimized estimated SINR.

In another exemplary embodiment, the optimized estimated SINR is transmitted to a central computing system (e.g., the one or more central computers 12) and stored (e.g., in the database 20) for analysis of network coverage and performance within the wireless network environment 26. The optimized estimated SINR values may be analyzed to assist in engineering and design of wireless communication infrastructure. After block 410, the method 400 proceeds to enter a standby state at block 412.

In an exemplary embodiment, the method 400 repeatedly exits the standby state 412 and restarts at block 402. In a non-limiting example, the method 400 exits the standby state 412 and restarts on a timer, for example, every three hundred milliseconds.

The system 10 and methods 100, 400 of the present disclosure offer several advantages. By training the regression model based on the plurality of wireless connection datasets, the regression model is able to determine the estimated SINR for any location in the environment based on measured environment parameters, reducing reliance on low-resolution SINR estimation techniques. Training of the SINR optimization machine learning algorithm allows for optimization of the estimated SINR based on edge and/or corner cases generated using computer simulation. The method 400 demonstrates an exemplary practical application of the system 10 and method 100 to determine optimized estimated SINRs.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method for estimating signal to interference and noise ratio (SINR) in a wireless network environment, the method comprising:

collecting a plurality of wireless connection datasets about the wireless network environment, wherein each of the plurality of wireless connection datasets includes at least one measured environment parameter and a measured SINR, wherein collecting the plurality of wireless connection datasets further comprises:

receiving the plurality of wireless connection datasets from one or more wireless devices, wherein the at least one measured environment parameter of each of the plurality of wireless connection datasets includes at least one of: a channel quality indication (CQI) value, a weather condition value, and an environment complexity value;

generating a regression model based at least in part on the plurality of wireless connection datasets, wherein the regression model is configured to determine an estimated SINR based on the at least one measured environment parameter; and training an SINR optimization machine learning algorithm to determine an optimized estimated SINR based at least in part on the estimated SINR, wherein training the SINR optimization machine learning algorithm further comprises:

determining a plurality of tested SINR deviations between the estimated SINR determined by the regression model and the measured SINR in each of the plurality of wireless connection datasets; and training the SINR optimization machine learning algorithm based at least in part on the plurality of tested SINR deviations, wherein the SINR optimization machine learning algorithm is trained to receive the at least one measured environment parameter and the estimated SINR as an input and provide the optimized estimated SINR as an output.

2. The method of claim 1, wherein the environment complexity value quantifies at least one of: a number of obstacles and an average height of obstacles which are obstructive to wireless transmissions.

3. The method of claim 2, wherein the environment complexity value is determined by each of the one or more wireless devices using an environment complexity identification machine learning model.

4. The method of claim 1, wherein the one or more wireless devices includes at least: a vehicle equipped with a vehicle communication system.

5. The method of claim 1, wherein training the SINR optimization machine learning algorithm further comprises:

training the SINR optimization machine learning algorithm to account for edge cases using a plurality of simulated wireless network environments.

6. The method of claim 5, wherein training the SINR optimization machine learning algorithm to account for edge cases using a plurality of simulated wireless network environments further comprises:

generating a plurality of simulated wireless network environments using a computer simulation; and training the SINR optimization machine learning algorithm based at least in part on the plurality of simulated wireless network environments.

7. The method of claim 6, wherein generating the plurality of simulated wireless network environments further comprises:

initializing the plurality of simulated wireless network environments, wherein each of the plurality of the simulated wireless network environments is defined by at least one simulated environment parameter;

adding a plurality of simulated wireless nodes to each of the plurality of simulated wireless network environments to form a plurality of simulated wireless network environments; and measuring one or more simulated SINRs within each of the plurality of simulated wireless network environments.

8. The method of claim 7, wherein training the SINR optimization machine learning algorithm based at least in part on the plurality of simulated wireless network environments further comprises:

determining one or more estimated SINRs for each of the plurality of simulated wireless network environments using the regression model based at least in part on the at least one simulated environment parameter of each of the plurality of simulated wireless network environments;

comparing the one or more estimated SINRs to the one or more simulated SINRs for each of the plurality of simulated wireless network environments to determine a plurality of simulated SINR deviations; and training the SINR optimization machine learning algorithm based at least in part on the at least one simulated environment parameter of each of the plurality of simulated wireless network environments and the plurality of simulated SINR deviations.

9. A system for estimating signal to interference and noise ratio (SINR) in a wireless network environment, the system comprising:

a plurality of wireless nodes; and one or more central computers in electrical communication with the plurality of wireless nodes, wherein the one or more central computers are programmed to:

collect a plurality of wireless connection datasets about the wireless network environment using the plurality of wireless nodes, wherein each of the plurality of wireless connection datasets includes at least one measured environment parameter and a measured SINR, wherein to collect the plurality of wireless connection datasets, the one or more central computers are further programmed to:

receive the plurality of wireless connection datasets from the plurality of wireless nodes, wherein the plurality of wireless connection datasets are collected by one or more wireless devices in wireless communication with the plurality of wireless nodes, wherein the one or more wireless devices includes at least: a vehicle equipped with a vehicle communication system, and wherein the at least one measured environment parameter of each of the plurality of wireless connection datasets includes at least one of: a channel quality indication (CQI) value, a weather condition value, and an environment complexity value;

generate a regression model based at least in part on the plurality of wireless connection datasets, wherein the regression model is configured to determine an estimated SINR based on the at least one measured environment parameter; and train an SINR optimization machine learning algorithm to determine an optimized estimated SINR based at least in part on the estimated SINR, wherein to train the SINR optimization machine learning algorithm, the one or more central computers are further programmed to:

determine a plurality of tested SINR deviations between the estimated SINR determined by the regression model and the measured SINR in each of the plurality of wireless connection datasets; and train the SINR optimization machine learning algorithm based at least in part on the plurality of tested SINR deviations, wherein the SINR optimization machine learning algorithm is trained to receive the at least one measured environment parameter and the estimated SINR as an input and provide the optimized estimated SINR as an output.

10. The system of claim 9, wherein to train the SINR optimization machine learning algorithm, the one or more central computers are further programmed to:

train the SINR optimization machine learning algorithm to account for edge cases using a plurality of simulated wireless network environments.

11. The system of claim 10, wherein to train the SINR optimization machine learning algorithm to account for edge cases using the plurality of simulated wireless network environments, the one or more central computers are further programmed to:

generate a plurality of simulated wireless network environments using a computer simulation; and train the SINR optimization machine learning algorithm based at least in part on the plurality of simulated wireless network environments.

12. The system of claim 11, wherein to generate the plurality of simulated wireless network environments, the one or more central computers are further programmed to:

initialize the plurality of simulated wireless network environments, wherein each of the plurality of the simulated wireless network environments is defined by at least one simulated environment parameter, and wherein the at least one simulated environment parameter for each of the plurality of the simulated wireless network environments is determined by sampling from a plurality of probability distributions corresponding to each of the at least one simulated environment parameter;

add a plurality of simulated wireless nodes to each of the plurality of simulated wireless network environments to form a plurality of simulated wireless network environments; and measure one or more simulated SINRs within each of the plurality of simulated wireless network environments.

13. The system of claim 12, wherein to train the SINR optimization machine learning algorithm based at least in part on the plurality of simulated wireless network environments, the one or more central computers are further programmed to:

determine one or more estimated SINRs for each of the plurality of simulated wireless network environments using the regression model based at least in part on the at least one simulated environment parameter of each of the plurality of simulated wireless network environments;

compare the one or more estimated SINRs to the one or more simulated SINRs for each of the plurality of simulated wireless network environments to determine a plurality of simulated SINR deviations; and train the SINR optimization machine learning algorithm based at least in part on the at least one simulated environment parameter of each of the plurality of simulated wireless network environments and the plurality of simulated SINR deviations.

14. A method for estimating signal to interference and noise ratio (SINR) in a wireless network environment, the method comprising:

receiving a plurality of wireless connection datasets from one or more wireless devices, wherein each of the plurality of wireless connection datasets includes at least one measured environment parameter and a measured SINR, and wherein the at least one measured environment parameter of each of the plurality of wireless connection datasets includes at least one of: a channel quality indication (CQI) value, a weather condition value, and an environment complexity value;

generating a regression model based at least in part on the plurality of wireless connection datasets, wherein the regression model is configured to determine an estimated SINR based on the at least one measured environment parameter; and determining a plurality of tested SINR deviations between the estimated SINR determined by the regression model and the measured SINR in each of the plurality of wireless connection datasets; and training an SINR optimization machine learning algorithm based at least in part on the plurality of tested SINR deviations, wherein the SINR optimization machine learning algorithm is trained to receive the at least one measured environment parameter and the estimated SINR as an input and provide an optimized estimated SINR as an output.

15. The method of claim 14, wherein training the SINR optimization machine learning algorithm further comprises:

generating a plurality of simulated wireless network environments using a computer simulation; and training the SINR optimization machine learning algorithm to account for edge cases based at least in part on the plurality of simulated wireless network environments.

16. The method of claim 15, wherein training the SINR optimization machine learning algorithm based at least in part on the plurality of simulated wireless network environments further comprises:

determining one or more estimated SINRs for each of the plurality of simulated wireless network environments using the regression model based at least in part on at least one simulated environment parameter of each of the plurality of simulated wireless network environments;

comparing the one or more estimated SINRs to one or more simulated SINRs for each of the plurality of simulated wireless network environments to determine a plurality of simulated SINR deviations; and training the SINR optimization machine learning algorithm based at least in part on the at least one simulated environment parameter of each of the plurality of simulated wireless network environments and the plurality of simulated SINR deviations.

* * * * *